United States Patent
Di Marco et al.

(10) Patent No.: US 10,893,457 B2
(45) Date of Patent: Jan. 12, 2021

(54) ROUTE DISCOVERY IN A MESH COMMUNICATION NETWORK

(71) Applicant: Telefonaktiebolaget LM Ericsson (publ), Stockholm (SE)

(72) Inventors: Piergiuseppe Di Marco, Sollentuna (SE); Thomas Rimhagen, Linköping (SE); Jingcheng Zhang, Norrköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 16/308,772

(22) PCT Filed: Jul. 14, 2017

(86) PCT No.: PCT/SE2017/050784
§ 371 (c)(1),
(2) Date: Dec. 10, 2018

(87) PCT Pub. No.: WO2018/017009
PCT Pub. Date: Jan. 25, 2018

(65) Prior Publication Data
US 2019/0253951 A1    Aug. 15, 2019

Related U.S. Application Data

(60) Provisional application No. 62/364,484, filed on Jul. 20, 2016.

(51) Int. Cl.
*H04W 40/02* (2009.01)
*H04L 12/721* (2013.01)
(Continued)

(52) U.S. Cl.
CPC ............ *H04W 40/02* (2013.01); *H04L 45/16* (2013.01); *H04L 45/26* (2013.01); *H04L 45/745* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2007/0064950 A1* | 3/2007 | Suzuki | H04W 12/04 380/270 |
| 2008/0130664 A1* | 6/2008 | Lee | H04L 45/122 370/401 |

(Continued)

OTHER PUBLICATIONS

International Search Report and Written Opinion of the International Searching Authority for International Application No. PCT/SE2017/050784 dated Sep. 5, 2017.

(Continued)

*Primary Examiner* — Natasha W Cosme
(74) *Attorney, Agent, or Firm* — Sage Patent Group

(57) ABSTRACT

A relay node is configured to discover a route between a route origination node and a route destination node in a mesh communication network. The relay node in this regard generates a route request message that requests a route from the route origination node through the mesh communication network to the route destination node. The relay node transmits the route request message via unicast or broadcast, depending respectively on whether a routing table at the relay node has or does not have an entry indicating a known route to the route destination node.

23 Claims, 18 Drawing Sheets

(51) Int. Cl.
  *H04L 12/761* (2013.01)
  *H04L 12/741* (2013.01)
  *H04W 40/24* (2009.01)
  *H04W 84/18* (2009.01)

(52) U.S. Cl.
  CPC .......... *H04W 40/246* (2013.01); *H04W 40/24* (2013.01); *H04W 84/18* (2013.01); *Y02D 30/70* (2020.08)

(56) References Cited

U.S. PATENT DOCUMENTS

| | | |
|---|---|---|
| 2008/0137580 A1 | 6/2008 | Axelsson et al. |
| 2010/0054192 A1* | 3/2010 | Kim ..................... H04L 45/121 370/329 |
| 2016/0088424 A1 | 3/2016 | Polo et al. |

OTHER PUBLICATIONS

Yi et al., "Smart Route Request for On-demand Route Discovery in Constrained Environments," Wireless Information Technology and Systems (ICWITS), 2012 IEEE International Conference, Nov. 11, 2012, 4 pages.

Yi et al., "Smart Route Request for Lightweight On-demand Ad hoc Distance-vector Routing—Next Generation," Network Working Group, Internet-Draft, Jul. 4, 2014, 11 pages.

European Search Report for patent application EP 17 83 1440, dated May 14, 2019, 4 pages.

Charles E. Perkins et al., "Ad-hoc On-Demand Distance Vector Routing", Mobile Computing Systems and Applications, 1999, Second IEEE workshop on New Orleans, LA, USA, Feb. 25-26, 1999, Los Alamitos, CA, USA, Feb. 25, 1999 XP010323394, 11 Pages.

* cited by examiner

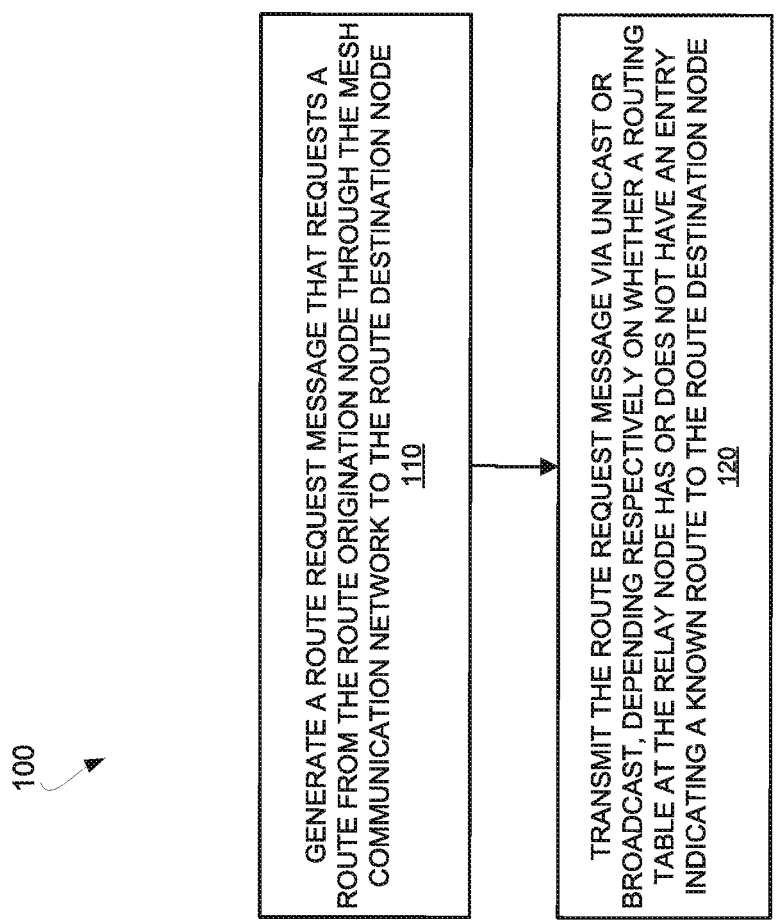

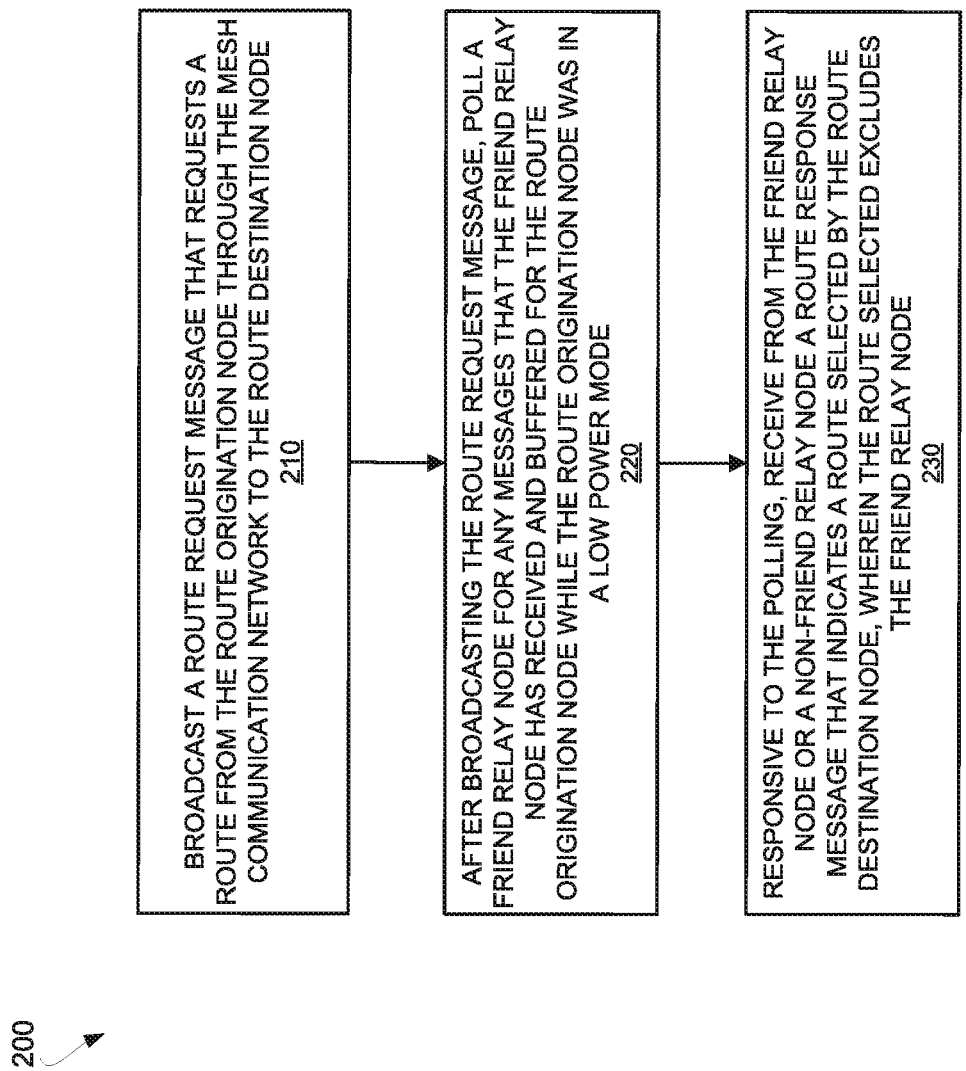

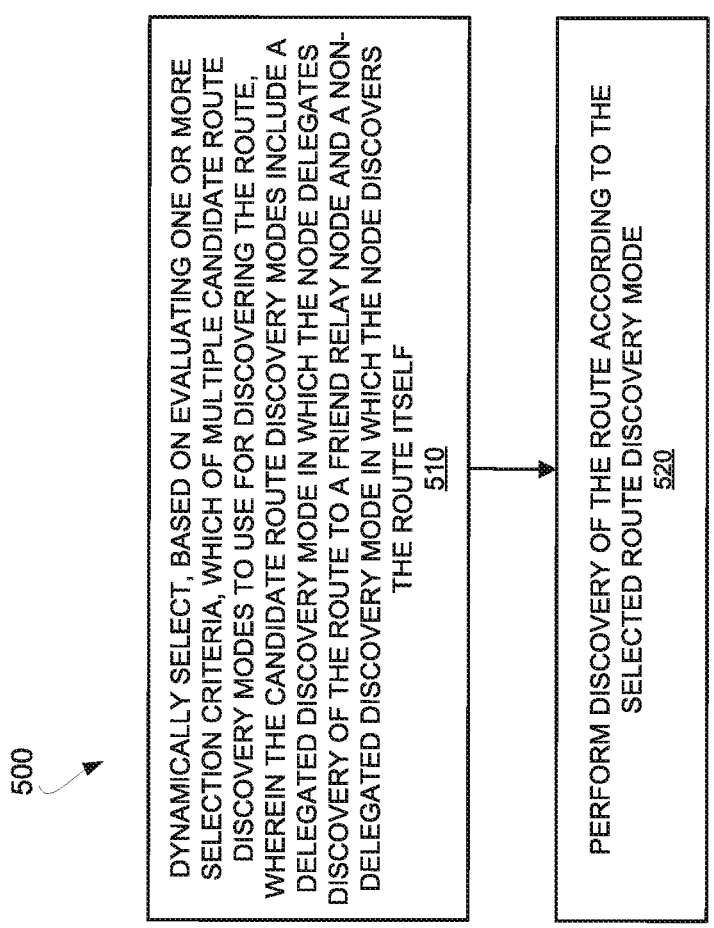

ROUTE DISCOVERY IN A MESH COMMUNICATION NETWORK

RELATED APPLICATIONS

This application is a 35 U.S.C. § 371 national stage application of PCT International Application No. PCT/SE2017/050784, filed on Jul. 14, 2017, which itself claims priority to U.S. Provisional Patent Application Ser. No. 62/364,484 filed on Jul. 20, 2016, the entire contents of which are incorporated herein by reference.

TECHNICAL FIELD

The present disclosure relates generally to a mesh communication network, and more particularly to route discovery in a mesh communication network.

BACKGROUND

A mesh communication network is a network topology in which nodes cooperate with one another to distribute data in the network. Mesh network topologies are often used by low-power wireless communication devices to increase network coverage and flexibility. Indeed, a mesh network does not require that every node be within radio communication range of every other node (e.g., requiring high power transmission). Instead, a mesh network includes relay nodes that forward data from hop to hop, so that data propagates along a desired path via multiple lower power transmissions. A message from an origination node may therefore reach a destination node via several other nodes serving as relays. Normally, relays (routers) are assumed to be always powered on.

One approach to realizing a mesh network involves flooding. In a flooding network, each relay node that receives a message will forward it via broadcast. In order to avoid loops with infinite retransmissions, restrictions on the number of such transmissions is configured in each message. If the message has been repeated more than the configured number, the message is discarded by the relay node that receives it. Such number is known as Time-to-Live (TTL). The flooding method has been proposed to support mesh networking for wireless communication technologies such as the Bluetooth Low Energy (BLE) Mesh networks. This method requires no routing information and scheduling. It is also very resistant to changes in the network topology. Also this approach fits well with the characteristics of nodes in low power networks, which are usually constrained in terms of memory and computational resources.

A more complex way of delivering messages through multi-hop networks is called routing. In a routing enabled network, a message is forwarded from the source node to the destination node(s) via a pre-created route. One of the advantages of a routing network is that the messages are only sent on one route from the source to the destination. Only the nodes on the route are involved in forwarding the message. This means that unnecessary messages created in the network by flooding can be avoided, the interference is reduced, and the network throughput will increase.

In the class of reactive routing protocols, the routes are defined between a Route Originator (RO) node and a Route Destination (RD) node. In order to create a route to a given destination, the RO sends a Route Request (RREQ) message to the RD. The RREQ message is broadcasted along the network. Each relay node that receives the RREQ retransmits the message until all the relay nodes receive this request. When this message has reached the RD, the RD sends a unicast Route Reply (RREP) back to the RO, along the best route chosen according to some criteria, e.g., number of hops or accumulated signal strength. Once a relay receives a RREP, it saves the routing information into its routing table (RT). The routing information is used for forwarding messages that need to be routed. Eventually, when the RREP reaches the RO, the RO knows that the destination has been reached and, thereby, the route is created.

In order to conserve power, some nodes are programmed as low power nodes (LPN). Such nodes are "sleeping" (in low power mode) most of the time and do not participate in message forwarding for the network. The LPN only "wakes up" when it needs to send any messages or wants to receive messages sent to it. A problem for the LPN to receive messages is that it cannot predict when the messages are supposed to come. In this case, once a low power node first joins the network, it establishes "friendship" with one of the relays within its radio vicinity. Such a relay is called the friend relay for that low power node. As defined for the current BLE specification, one LPN should only have one friend relay, while one relay can be the friend relay for multiple LPNs. Once a message sent to a LPN is received by its friend relay, the message is buffered by that relay node. On the LPN side, once the friendship is established, the LPN polls the friend relay periodically. Once the poll message is received by the friend relay, the buffered messages are sent to the LPN.

According to current BLE mesh routing specifications, the RREP must be generated by the RD. This means that all intermediate nodes between the RO and RD need to store a RO-RD pair in their routing table. By doing so, the RREQ needs to be flooded through the whole mesh network every time a new route is being created. Moreover, as the RREP for a LPN can be received only through its friend relay node, the selected route must traverse through the friend relay node.

SUMMARY

One or more embodiments herein include approaches for discovering a route between a route origination node and a route destination node in a mesh communication network. According to some embodiments, for example, a relay node generates a route request message that requests a route from the route origination node through the mesh communication network to the route destination node. The relay node then transmits the route request message via unicast or broadcast, depending respectively on whether a routing table at the relay node has or does not have an entry indicating a known route to the route destination node. In one embodiment, for instance, the relay node transmits the route request message via unicast to a next-hop node along the known route if the routing table has an entry indicating the known route. In this case, therefore, the relay node advantageously avoids flooding the network with the route request message, so as to conserve radio resources in the network.

In some embodiments, the relay node receives, in response to the route request message, a route response message that indicates a route selected by the route destination node. In this case, the relay node may transmit the route response message towards the route origination node via unicast.

Alternatively or additionally, the relay node may be a friend relay node delegated by both the route origination node and another origination node in the mesh communication network to discover a route towards the same route destination node. In this case, the known route may be part of a route previously discovered by the relay node from the another origination node to the route destination node.

In still other embodiments, the relay node may receive the route request message via unicast from another node in the mesh communication network. In this case, the relay node may, responsive to receiving the route request message, modify the route request message to include the relay node in a route tracked by the route request message.

Yet other embodiments herein include a route origination node for discovering a route between the route origination node and a route destination node in a mesh communication network. The route origination node broadcasts a route request message that requests a route from the route origination node through the mesh communication network to the route destination node. After broadcasting the route request message, the route origination node polls a friend relay node for any messages that the friend relay node has received and buffered for the route origination node while the route origination node was in a low power mode. Responsive to this polling, the route origination node receives from the friend relay node or a non-friend relay node a route response message that indicates a route selected by the route destination node. The route selected excludes the friend relay node.

Still other embodiments include a non-friend relay node for discovering a route between a route origination node and a route destination node in a mesh communication network. The non-friend relay node is configured to receive from the route origination node a route request message that requests a route from the route origination node through the mesh communication network to the route destination node. The non-friend relay node is also configured to, responsive to receiving the route request message, broadcast the route request message. The non-friend relay node is further configured to, responsive to broadcasting the route request message, receive a route response message that indicates a route selected by the route destination node. The non-friend relay node is moreover configured to transmit the route response message towards the route origination node, by transmitting the route response message towards a friend relay node excluded from the selected route or by transmitting the route response message directly to the route origination node during a detected friend forwarding period, wherein a friend relay node is a node configured to forward buffered messages to the route origination node during a friend forwarding period.

Yet other embodiments include a node in a mesh communication network for discovering a route to a route destination node. The node is configured to dynamically select, based on evaluating one or more selection criteria, which of multiple candidate route discovery modes to use for discovering the route, wherein the candidate route discovery modes include a delegated discovery mode in which the node delegates discovery of the route to a friend relay node and a non-delegated discovery mode in which the node discovers the route itself. The node is also configured to perform discovery of the route according to the selected route discovery mode.

Further embodiments include a friend relay node for assisting a node in a mesh communication network discover a route to a route destination node. The friend relay node is configured to receive from the node a route status query that queries the friend relay node for a route status, the route status indicating whether a routing table at the friend relay node has an entry indicating a known route from the friend relay node to the route destination node. The friend relay node is also configured to determine the route status based on inspection of the routing table. The friend relay node is moreover configured to transmit a response to the route status query indicating the route status.

Embodiments also include a friend relay node for route discovery in a mesh communication network. The friend relay node is configured to receive a route request message which requests a route to a route destination node that has delegated route discovery to the friend relay node. The friend relay node is also configured to, responsive to the route request message, select a route to the route destination node and transmitting a route response message indicating the selected route on behalf of the route destination node.

Embodiments further include corresponding methods, apparatus, carriers, and computer program products.

Moreover, one or more embodiments herein include a method that allows low power nodes to delegate routing discovery to more powerful nodes to which they associate. If the delegated node already knows a route to the desired destination, then the route discovery request is propagated via unicast transmissions along the known route, thus reducing the network resource utilization. Moreover, a complementary method may optimize the route discovery for a low power node, when the route discovery is not delegated. This may involve for instance a non-friend relay node transmitting a route response message towards a route origination node.

BRIEF DESCRIPTION OF THE DRAWINGS

FIG. 3 is a logic flow diagram of a method performed by a relay node according to some embodiments.

FIG. 5 is a logic flow diagram of a method performed by a route origination node according to some embodiments.

FIG. 9 is a logic flow diagram of a method performed by a node according to some embodiments.

DETAILED DESCRIPTION

Figure 1:
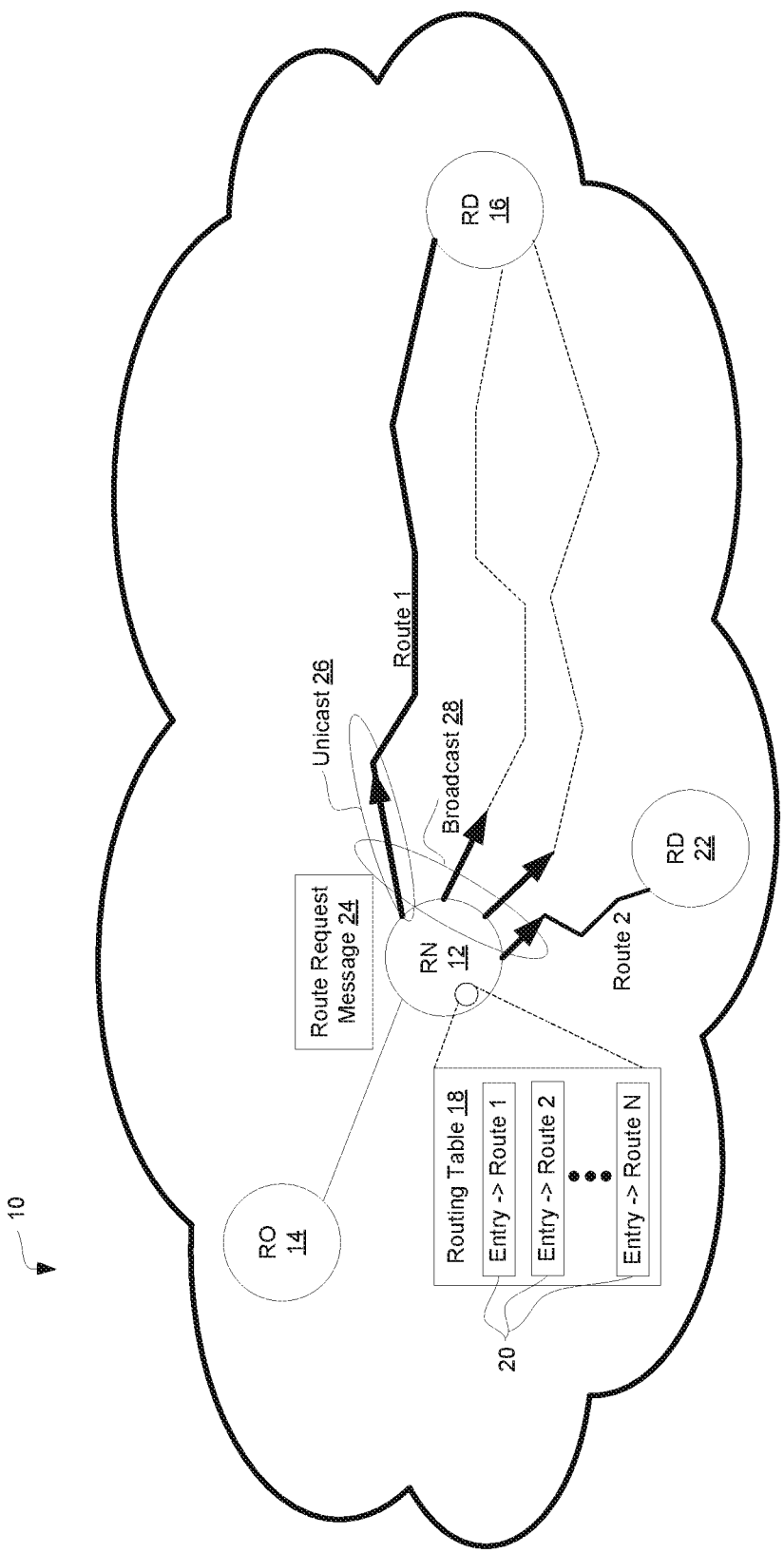
FIG. 1 is a block diagram of a mesh communication network that includes a relay node according to some embodiments.

FIG. 1 shows a mesh communication network 10 according to some embodiments. As shown, the network 10 includes multiple relay nodes that cooperate to propagate messages through the network 10. FIG. 1 focuses on a particular relay node 12.

The relay node 12 has a routing table 18. This routing table 18 contains one or more entries 20. Different entries 20 indicate different known routes to different route destination (RD) nodes. As shown, for instance, the routing table 18 includes a first entry that indicates a known route (Route 1) to RD node 16. The routing table 18 also includes a second entry that indicates a known route (Route 2) to RD node 22. Irrespective of the particular entries, the relay node 12 according to some embodiments exploits this routing table 18 during route discovery, e.g., in order to re-use a known route and thereby conserve radio resources in the network 10.

Specifically, the relay node 12 may be prompted to discover a route between a route origination (RO) node and a particular route destination (RD) node. Prompted to discover such a route, the relay node 12 generates a route request message 24. The route request message 24 requests a route from the RO node 14 through the mesh communication network 10 to RD node 16. The relay node 12 then transmits this route request message 24.

Notably, the relay node 12 transmits the route request message 24 via unicast 26 or broadcast 28, depending respectively on whether a routing table 18 at the relay node 12 has or does not have an entry 20 indicating a known route to RD node 16. The relay node 12 therefore inspects its routing table 18 for whether any such entry exists. If the inspection reveals such an entry does not exist, the relay node 12 transmits the route request message 24 via broadcast 28. That is, the relay node 12 floods the message 24 to all neighboring nodes, e.g., so as to propagate along all routes. This flooding may of course consume substantial radio transmission and processing resources in the network 10. Accordingly, if the inspection reveals such an entry does exist, the relay node 12 transmits the route request message 24 via unicast 26, rather than broadcast. This may involve transmitting the route request message 24 to a next-hop node along the known route revealed to exist in the routing table 18.

As shown, for instance, the relay node's routing table 18 has an entry indicating a known route (Route 1) to RD node 16. The relay node 12 therefore transmits the route request message 24 via unicast 26. The relay node 12 in particular transmits the route request message 24 to the next hop along the Route 1 indicated in the routing table 18.

In this way, the relay node 12 effectively "re-uses" a known route to propagate a route request message, if such a route already exists. By re-using a known route, the relay node 12 advantageously avoids flooding the network 10 with the route request message 24. This correspondingly conserves radio transmission and processing resources in the network 10, and avoids introducing extra control messages, e.g., as compared to current mesh specifications.

Note that this remains the case even in contexts such as Bluetooth Low Energy (BLE) where the route destination node must be the node to respond to the route request message 24 with a route response message. In such a context, intermediate nodes between the RO node 14 and the RD node 16 store entries in their routing tables to indicate routes between certain RO-RD pairs. When the relay node 12 inspects its routing table 18 for whether a known route to the RD node 16 exists, the relay node 12 does so by inspecting the routing table 18 for any RO-RD pairs that include RD node 16 as RD, no matter the RO in that pair. This contrasts with routing approaches in which, in order to forward a message with an RO address and a RD address, there must be an exact match of the RO and RD addresses in the routing table. In any event, this effectively means that the relay node 12 merges the route being discovered between RO node 14 and RD node 16 with a previously discovered route between some other RO node and RD node 16.

Figure 2:
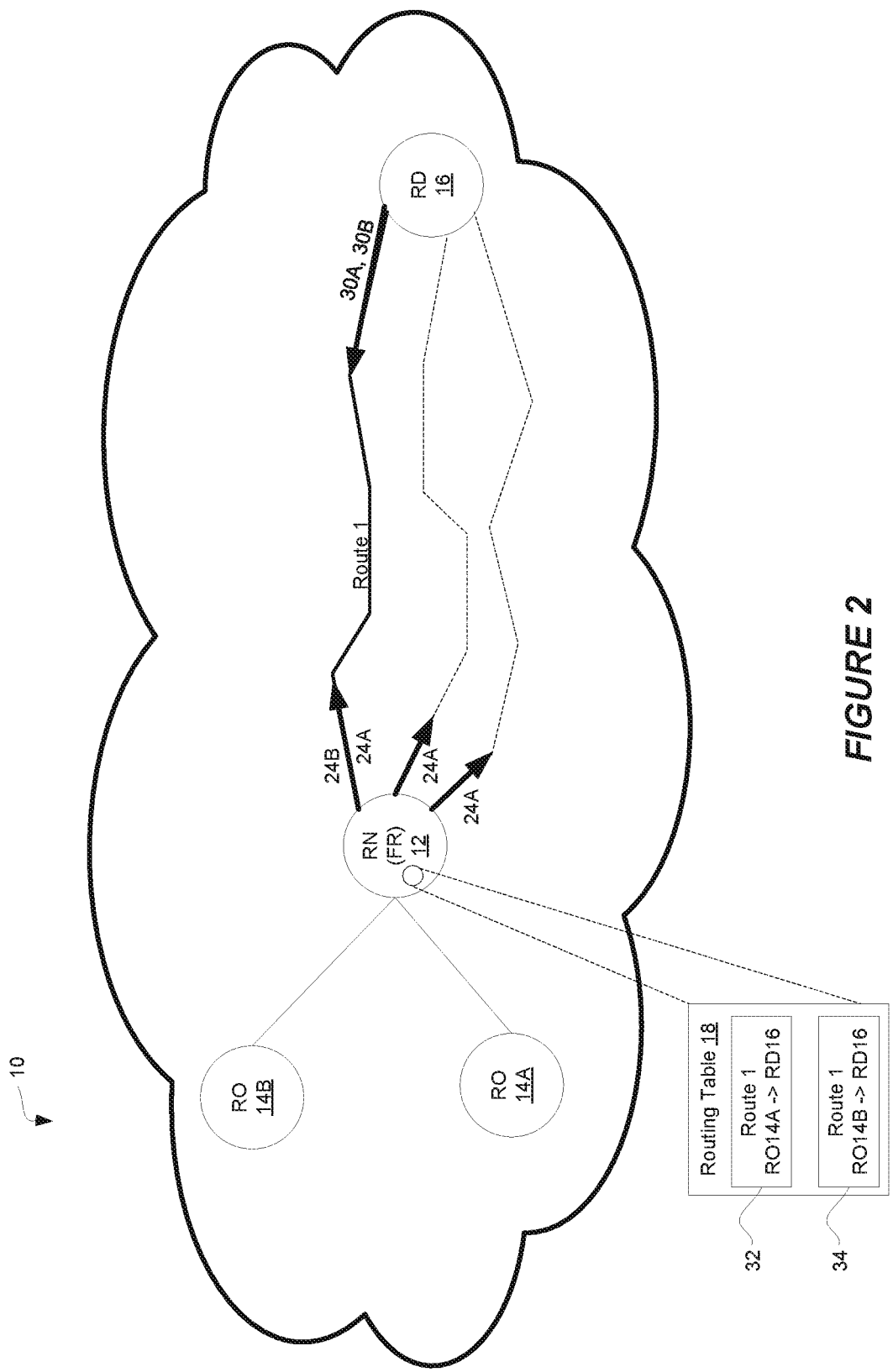
FIG. 2 is a block diagram of a mesh communication network in which a relay node discovers an exemplary route.

Consider the example shown in FIG. 2. In this example, RO node 14A delegates relay node 12 as a friend relay (FR) node. As a friend relay node, relay node 12 may be delegated to discover a route from RO node 14A to RD node 16. The relay node 12 inspects its routing table 18 to determine if any known routes exist to RD node 16. Assume in this example that no such known routes exist. Accordingly, the relay node 12 floods a first route request message 24A by transmitting it via broadcast. The RD node 16 receives this first route request message 24A, perhaps via multiple routes, and selects Route 1 as being the "best" route. The RD node 16 correspondingly transmits a route response message 30A back via unicast, along Route 1. When the relay node 12 receives this route response message 30A, the relay node 12 updates its routing table 18 to include an entry 32 indicating that Route 1 is the "best" route from RO node 14A to RD node 16.

Later, RO node 14B also delegates relay node 12 as a friend relay node. As a friend relay node, relay node 12 may also be delegated to discover a route from RO node 14B to RD node 16. The relay node 12 inspects its routing table 18 to determine if any known routes exist to RD node 16, no matter the RO node from which that route originates. By way of this inspection, the relay node 12 identifies that the routing table 18 includes entry 32 indicating Route 1 to RD node 16. Rather than relay node 12 itself returning a route response message, though, relay node 12 transmits a second route request message 24B towards RD node 16, by transmitting it via unicast along Route 1. Transmitting the second route request message 24B via unicast saves radio resources in the network 10 as compared to transmitting it via broadcast (as was done with the first route request message 24A). The RD node 16 receives this second route request message 24B and in this example selects Route 1 as being the "best" route from RO node 14B to RD node 16. The RD node 16 correspondingly transmits a route response message 30B back via unicast, along Route 1. When the relay node 12 receives this route response message 30B, the relay node 12 updates its routing table 18 to include another entry 34 indicating that Route 1 is the "best" route from RO node 14B to RD node 16.

This example of FIG. 2 demonstrates that a friend relay node in some embodiments is configured to selectively unicast or broadcast a route request message depending respectively on whether a known route exists to the destination node. But a similar selective unicast-broadcast transmission approach may be implemented by other relay nodes in the network 10, such as non-friend relay nodes and any relay nodes more than one hop away from the route origination node. For example, the relay node 12 in other embodiments receives the route request message 24 from another node in the network 10, e.g., the relay node 12 did not originate that route request message 24. If the relay node 12 received the route request message 24 via broadcast, the route being discovered to the RD node 16 has not yet merged with any known route to the RD node 16. On the other hand, if the relay node 12 received the route request message 24 via unicast, the route being discovered to the RD node 16 has indeed merged with a known route to the RD node 16. In either case, the relay node 12 modifies the route request message 24 to include the relay node 12 in the route tracked by the route request message 24. The relay node 12 then transmits the modified route request message 24 so as to propagate the message 24 on towards the RD node 16. Even though the relay node 12 may not be a friend relay node one hop away from the route origination node, the relay node 12 nonetheless inspects its routing table 18 for whether a known route exists to the RD node 16 and transmits the modified route request message 24 via unicast or broadcast depending respectively on whether a known route exists or not. If the relay node 12 received the route request message 24 via unicast, this means the relay node 12 should indeed have such an entry and continue propagating the message 24 via unicast. In general, therefore, a relay node that is either a friend relay node delegated to discover a route, or that receives a unicast route request message from another relay node, may transmit a route request message via unicast or broadcast depending on if a known route to the route destination exists.

In view of the above, FIG. 3 generally illustrates a method 100 performed by a relay node 12 (e.g., a friend relay node) for discovering a route between a route origination node 14 and a route destination node 16 in a mesh communication network 10, according to one or more embodiments. As shown, the method 100 includes generating a route request message 24 that requests a route from the route origination node 14 through the mesh communication network 10 to the route destination node 16 (Block 110). The method 100 also includes transmitting the route request message 24 via unicast 26 or broadcast 28, depending respectively on whether a routing table 18 at the relay node 12 has or does not have an entry 20 indicating a known route to the route destination node 16 (Block 120). For example, this may involve transmitting the route request message 24 via unicast 26 to a next-hop node along the known route if the routing table 18 has an entry 20 indicating the known route.

The approach in FIGS. 1-3 advantageously conserves scarce radio resources in the network 10, by exploiting known routes in order to use unicast when possible. Moreover, the approach facilitates low complexity and/or low power in the route origination node 14. The route origination node 14 may for example simply befriend another node and avoid implementing routing features itself. The route origination node 14 in this regard may send messages by setting a friend flag (e.g., FRND=1) so that only the friend relay node processes them and delegate to its friend relay node the responsibility of initiating (or updating) route discovery towards a desired destination node. As another example, the route origination node 15 may send messages using an encryption method shared with the friend relay node, or use any other approach that causes only the friend relay node to process messages that the route origination node 15 sends.

In at least some embodiments, though, the approach in FIGS. 1-3 proves limiting because, if standing alone, it may limit which routes are discoverable. For example, where the route origination node 14 befriends a friend relay node which serves as the sole node via which a route response message is receivable, the approach standing alone may limit the routes discoverable to only those that include the friend relay node.

Figure 4A:
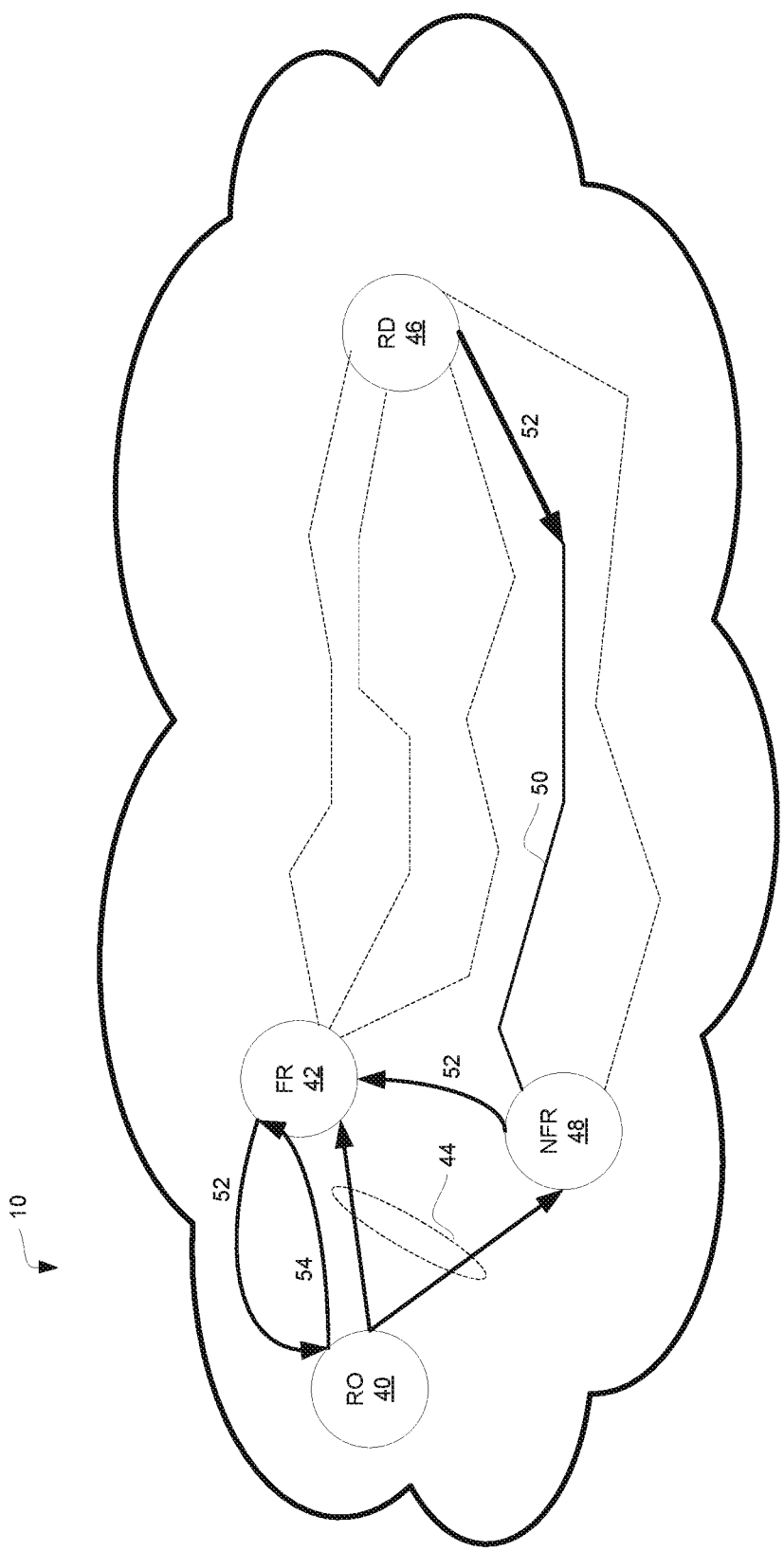
FIG. 4A is a block diagram of a mesh communication network illustrating embodiments for discovery of a route that excludes a friend relay node.
Figure 4B:
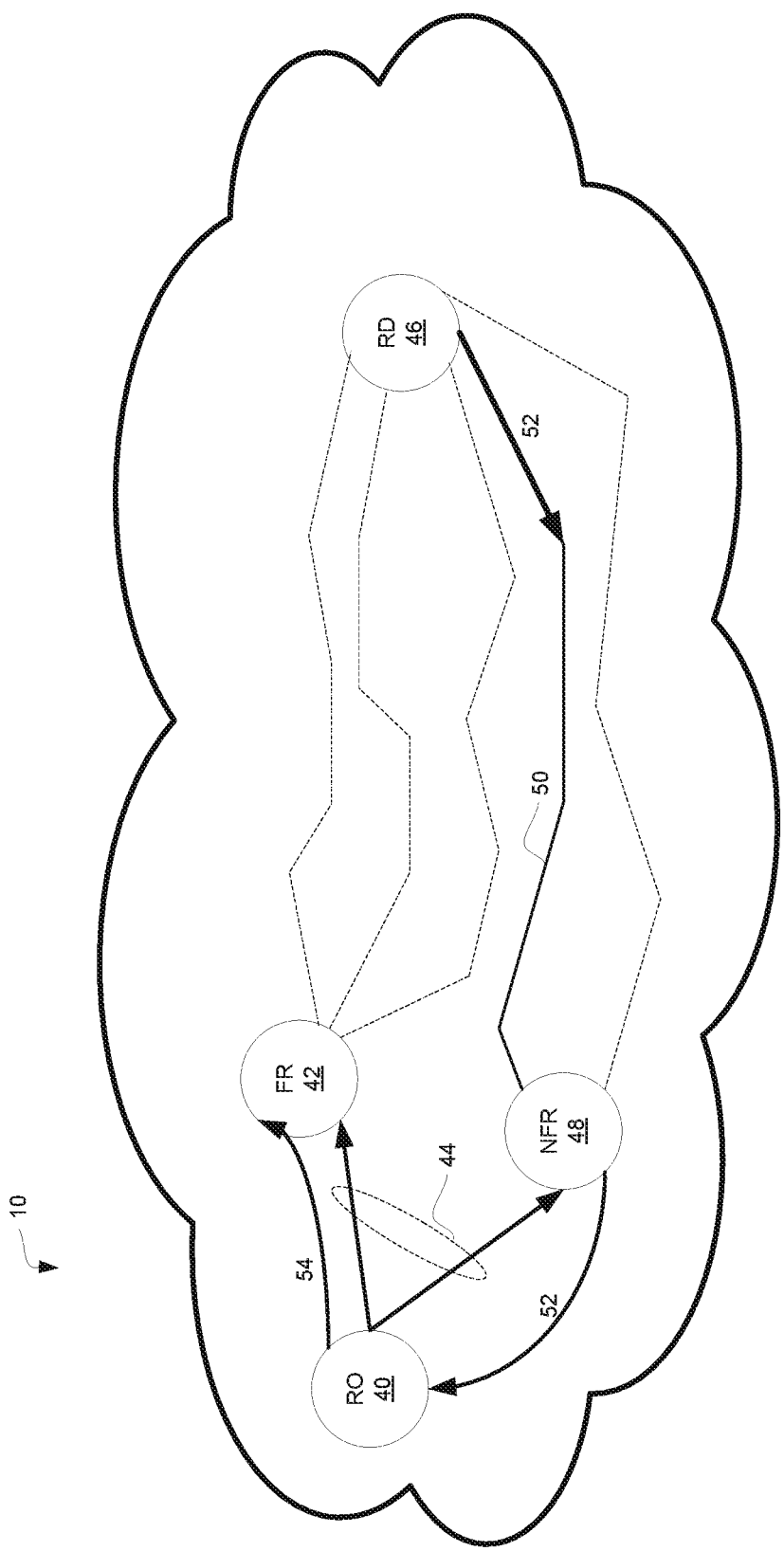
FIG. 4B is a block diagram of a mesh communication network illustrating other embodiments for discovery of a route that excludes a friend relay node.

Other embodiments herein by contrast facilitate discovery of routes that may exclude a friend relay node which a route origination node has befriended. FIGS. 4A-4B illustrate different aspects of these embodiments.

As shown in FIG. 4A, a route origination node 40 befriends a friend relay node 42. The route origination node 40 may do so, for example, so that the route origination node 40 can occasionally or periodically enter into a low power mode (e.g., sleep mode), yet still receive messages intended for it. Indeed, configured as a friend of the route origination node 40, the friend relay node 42 buffers any messages bound for the route origination node 40 that the friend relay node 42 receives while the route origination node 40 is in a low power mode. When the route origination node 40 exits the low power mode, the route origination node 40 polls friend relay node 42 for any messages that the friend relay node 42 buffered for the route origination node 40.

Embodiments in FIG. 4A capitalize on this friendship relationship in order to ensure that a route response message reaches the route origination node 40, even if the selected route indicated by that message does not include the friend relay node 42. In particular, referring to FIG. 4A, the route origination node 40 broadcasts a route request message 44 that requests a route from the route origination node 40 through the mesh communication network 10 to a route destination node 46. That is, the route origination node 40 itself institutes route discovery, rather than delegating route discovery to the friend relay node 42. The route origination node 40 may for example generate the route request message 44 to include a friend flag FRDN=0 so as to indicate that all relay nodes, including the friend relay node 42, should process the route request message 44. In any event, due to the broadcast nature of this transmission, the route request message 44 is received and processed not only by the friend relay node 42 but also a non-friend relay (NFR) node 48.

Responsive to receiving the route request message 44, both the friend relay node 42 and the non-friend relay node 48 in turn broadcast the route request message 44 so as to propagate it on towards the route destination node 46. When the route destination node 46 receives the route request message 44, possibly via multiple different routes, the route destination node 46 selects route 50 as being the "best" route. Route 50 includes the non-friend relay node 48 in the route 50, but does not include the friend relay node 42, since the route request message 44 associated with the route destination node's selection did not traverse the friend relay node 42 (i.e., the route request message 44 was transmitted to the non-friend relay node 48 directly). The route destination node 46 therefore returns a route response message 52 back along the selected route 50 via unicast. Because the non-friend relay node 48 is included in this selected route 50, the non-friend relay node 48 receives this route response message 52 from the route destination node 52, e.g., via one or more intermediate nodes.

The non-friend relay node 48 in turn transmits the route response message 52 towards the route origination node 40. Notably, though, the non-friend relay node 48 does so by transmitting the route response message 52 via the friend relay node 42; that is, the non-friend relay node 48 transmits the route response message 52 towards the friend relay node 42, even though the friend relay node 42 is not included in the selected route 50 indicated by the route response message 52. In this sense, then, the non-friend relay node 48 deviates from an approach of propagating the route response message 52 along the selected route 50. The non-friend relay node 48 does so in order that the friend relay node 42 will buffer and forward the route response message 52 on to the route origination node 40, e.g., in response to the route origination node 40 polling 54 the friend relay node 42 for any buffered messages.

The non-friend relay node 48 may transmit the route response message 52 towards the friend relay node 42 in any number of ways. In some embodiments, for example, the non-friend relay node 48 broadcasts (i.e., floods) the route response message 52. The non-friend relay node 48 may do so by broadcasting the route response message 52 towards an address of the route origination node 40. In at least some embodiments, the non-friend relay node configures the route response message 52 with a certain time to live (TTL) that guarantees or ensures with high probability the message 52 will reach the friend relay node 42. For example, in some embodiments where neighboring relay nodes are at most two hops away from one another from a radio vicinity point of view, the route response message 52 is broadcasted with a TTL greater than or equal to three hops.

Note, then, that the non-friend relay node 48 may effectively transmit the route response message 52 to the friend relay node 42 without knowing which node is the route origination node's friend and without knowing that friend's address. Indeed, the non-friend relay node 48 in this case simply floods the route response message 52 to the route origination node's address. This route response message 52 will be received and buffered by the friend relay node 42, as it buffers other application messages for the route origination node 40. Responsive to the route origination node 40 polling 54 the friend relay node 42, e.g., in accordance with its normal polling operation, the route origination node 40 receives the route response message 52 from the friend relay node 42 during a friend forwarding period (i.e., the period in which the friend relay node 42 sends buffered messages to the route origination node 40).

Flooding the route response message 52 with the aim of reaching the friend relay node 42 reduces complexity at the non-friend relay node 48, since the non-friend relay node 48 need not know the address of the friend relay node 42. However, flooding the route response message 52 does consume considerable radio resources in the network 10.

In one or more other embodiments, therefore, the non-friend relay node 48 transmits the route response message 52 to the friend relay node 42 along a discovered route that includes the friend relay node 42. The non-friend relay node 48 does not need the address of the friend relay node 42 to discover such a route.

In particular, the non-friend relay node 48 discovers a route from the non-friend relay node 48 to the route origination node 40 as the destination. The non-friend relay node 48 in this regard broadcasts a route request message that requests a route to the route origination node 40. When the friend relay node 42 receives this message, the friend relay node 42 generates and transmits a route response message, rather than forwarding the route request message onto the route origination node 40. That is, the friend relay node 42 responds to the route request message on behalf of the route origination node 40 as the requests' destination. After discovering this route from the non-friend relay node 48 to the route origination node 40, the non-friend relay node 48 uses this route to transmit the route response message 52 towards the friend relay node 42. That is, the route response message 52 for the route between the route origination node 40 and the route destination node 46 is sent via the route between the non-friend relay node 48 and the route origination node 40. This route response message 52 will be received and buffered by the friend relay node 42, as it buffers other application messages for the route origination node 40. Responsive to the route origination node 40 polling 54 the friend relay node 42, e.g., in accordance with its normal polling operation, the route origination node 40 receives the route response message 52 from the friend relay node 42.

No matter how the non-friend relay node 48 gets the route response message 52 to the friend relay node 42, the friend relay node 42 in some embodiments is configured to return an acknowledgement of receipt of that message 52 to the non-friend relay node 48. The friend relay node 42 may do so on behalf of the route origination node 40. The non-friend relay node 48 may therefore determine whether the friend relay node 42 received the route response message 52 by monitoring for whether the friend relay node 42 returns an acknowledgement of the route response message 52. If no acknowledgement is returned, e.g., after a defined time period, the non-friend relay node 48 may re-transmit the route response message 52. In some embodiments, the non-friend relay node 48 may re-transmit the route response message 52 after revising one or more transmission parameters. The non-friend relay node 48 may for instance increase the TTL value with which the route response message 52 is broadcasted. In fact, the non-friend relay node 48 may re-transmit the route response message 52 using a different approach (e.g., via broadcast after transmission via a discovered route fails, or via a discovered route after broadcast fails). If, however, the non-friend relay node 48 still does not receive an acknowledgement after one or more defined attempts, a routing error may be issued in this case.

FIG. 4B illustrates a different approach to capitalizing on a friendship relationship in order to ensure that the route response message 52 reaches the route origination node 40, even if the selected route indicated by that message does not include the friend relay node 42. Rather than targeting the friend relay node 42 for receipt of the route request message 52, the non-friend relay node 48 targets the route origination node 40 itself for receipt of the route request message 52. Indeed, the non-friend relay node 48 in these embodiments transmits the route response message 52 directly to the route origination node 40. The non-friend relay node 48 may do so during a detected friend forwarding period.

In particular, the non-friend relay node 48 may detect when the route origination node 40 polls 54 the friend relay node 42 for any buffered messages. Indeed, a polling message that the route origination node 40 sends in this regard may be overhead by the non-friend relay node 48. The non-friend relay node 48 exploits detection of such a polling message to effectively synchronize to the route origination node's awake period. Responsive to detecting when the route origination node 40 polls the friend relay node 42 for any buffered messages, the non-friend relay node 48 transmits the route response message 52 directly to the route origination node 52. That is, the non-friend relay node 48 simply capitalizes on the chance to send the message 52 while the route origination node 40 is awake.

Note that the approach illustrated in FIG. 4B proves advantageous in that it avoids message broadcasting, i.e., no broadcasting of the route response message 52 or of a route request message is required. The non-friend relay node 48 must just buffer route response messages directed to single-hop neighbors with which the non-friend relay node 48 has not befriended.

In view of the approaches shown in FIGS. 4A-4B, FIG. 5 shows a method 200 performed by a route origination node 40 for discovering a route between the route origination node 40 and a route destination node 46 in a mesh communication network 10 according to some embodiments. As shown, the method 200 comprises broadcasting a route request message 44 that requests a route from the route origination node 40 through the mesh communication network 10 to the route destination node 46 (Block 210). The method also comprises, after broadcasting the route request message 44, polling a friend relay node 42 for any messages that the friend relay node 42 has received and buffered for the route origination node 40 while the route origination node 40 was in a low power mode (Block 220). The method further comprises, responsive to that polling, receiving from the friend relay node 42 or a non-friend relay node 48 a route response message 52 that indicates a route 50 selected by the route destination node 46 (Block 230). The route 50 selected excludes the friend relay node 42. Where the route response message 52 is received from a non-friend relay node 48, that non-friend relay node 48 may be included in the selected route 50, even though the friend relay node 42 is excluded.

Figure 6:
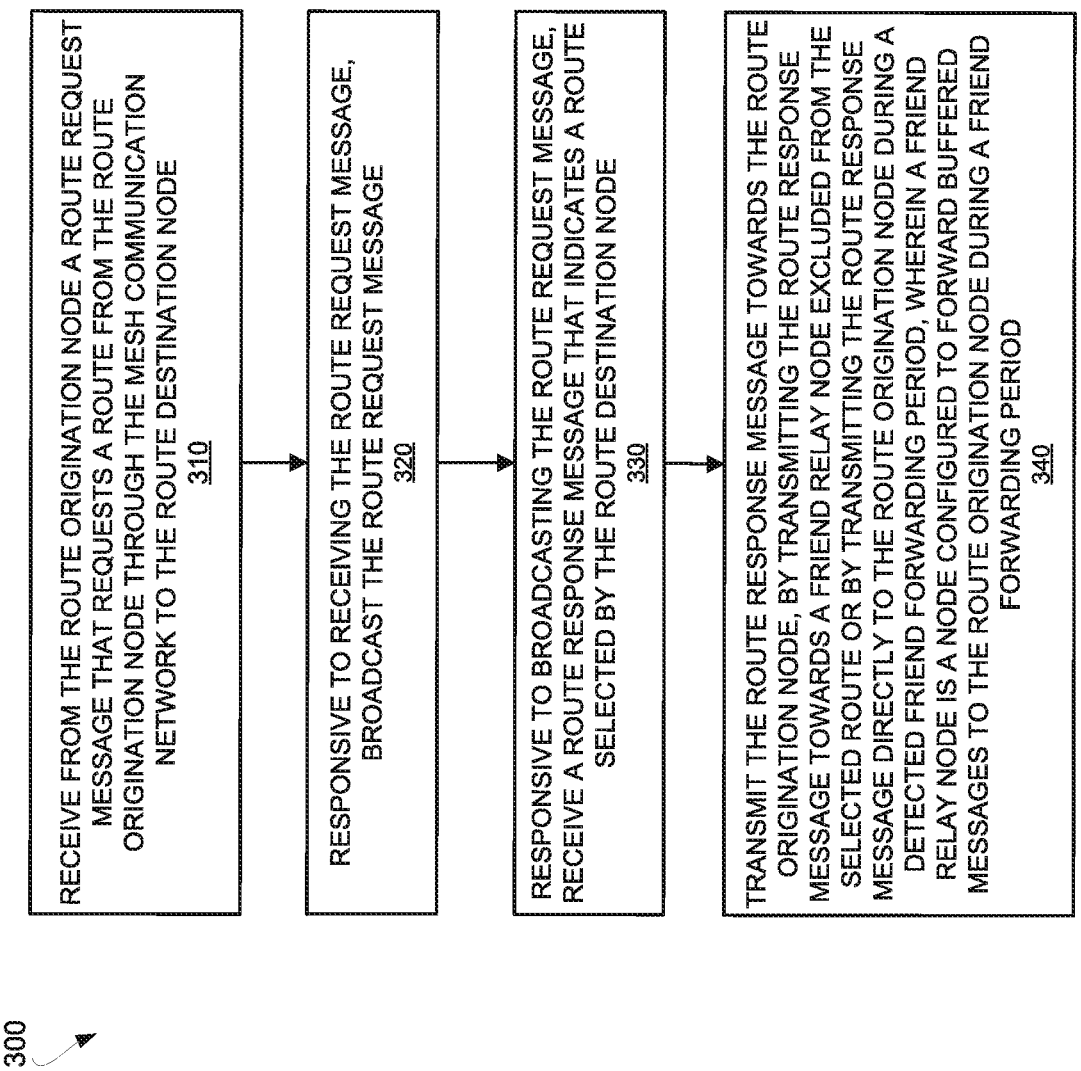
FIG. 6 is a logic flow diagram of a method performed by a non-friend relay node according to some embodiments.

FIG. 6 shows a corresponding method 300 performed by a non-friend relay node 48 for discovering a route 50 between a route origination node 40 and a route destination node 46 in a mesh communication network 10. The method 300 comprises receiving from the route origination node 40 a route request message 44 that requests a route from the route origination node 40 through the mesh communication network 10 to the route destination node 46 (Block 310). The method 300 further comprises, responsive to receiving the route request message 44, broadcasting the route request message 44 (Block 320). The method 300 also comprises, responsive to broadcasting the route request message 44, receiving a route response message 52 that indicates a route 50 selected by the route destination node 46 (Block 330). The method 300 also notably comprises transmitting the route response message 52 towards the route origination node 40, by transmitting the route response message 52 towards a friend relay node 42 excluded from the selected route 50 or by transmitting the route response message 52 directly to the route origination node 40 during a detected friend forwarding period. This friend relay node 42 is a node configured to forward buffered messages to the route origination node 40 during a friend forwarding period.

Figure 7:
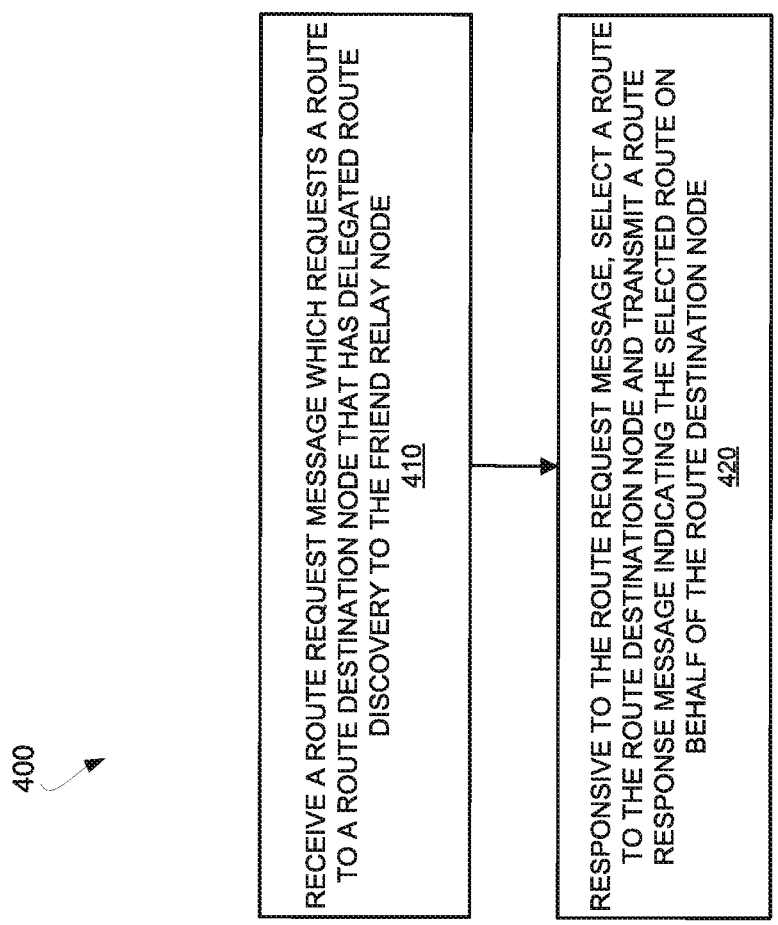
FIG. 7 is a logic flow diagram of a method performed by a friend relay node according to some embodiments.

FIG. 7 shows a method 400 performed by a friend relay node 42 for route discovery in a mesh communication network 10 according to some embodiments (e.g., shown in FIG. 4A). As shown, the method 400 comprises receiving a route request message which requests a route to a route destination node that has delegated route discovery to the friend relay node 42 (Block 410). In the embodiment of FIG. 4A, for instance, the friend relay node 42 may receive a route request message which requests a route to the route origination node 40 as the destination, which has delegated route discovery to the friend relay node 42. In any event, the method 400 further comprises, responsive to the route request message, selecting a route to the route destination node and transmitting a route response message indicating the selected route on behalf of the route destination node (Block 420). That is, rather than forwarding the route request message on to the route destination node for response by that destination node, the friend relay node 42 itself responds to the request message on behalf of the destination node.

Of course, in at least some embodiments, these approaches each require that a route origination node 40 befriend another node as well as implement a routing model. The route origination node 40 in this regard not only broadcasts a route request message, but also later polls its friend relay node in order to receive the route response message.

Note that a hybrid solution involving any of the approaches shown in FIGS. 4A-4B may be employed. A node may for instance attempt any of the approaches, e.g., in serial or parallel fashion as needed.

Figure 8:
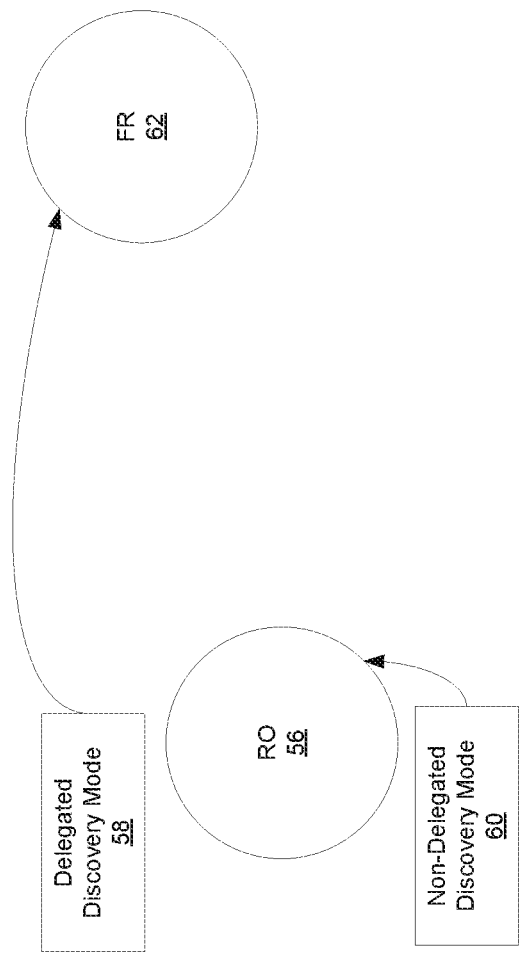
FIG. 8 is a block diagram illustrating different discovery modes of a route origination node according to some embodiments.

In fact, in some embodiments, a route origination node may dynamically select which of multiple candidate route discovery modes to use. FIG. 8 illustrates one embodiment in this regard.

As shown in FIG. 8, a route origination node 56 is configured to perform discovery of a route to a route destination node (not shown) according to either of two modes: a delegated discovery mode 58 or a non-delegated discovery mode 60. According to the delegated discovery mode 58, the route origination node 56 delegates discovery of the route to a friend relay node 62, e.g., according to approaches in FIGS. 1-3. According to the non-delegated discovery mode 60, the route origination node 56 discovers the route itself, e.g., according to the approaches in FIGS. 4A-4B. In some embodiments, for instance, the non-delegated discovery mode 60 involves the route origination node 56 broadcasting a route request message that requests the route to the route destination node, polling the friend relay node for any messages that the friend relay node has received and buffered for the node while the node was in a low power mode, and, responsive to that polling, receiving from the friend relay node or a non-friend relay node a route response message that indicates a route selected by the route destination node (where the route selected may exclude the friend relay node 62).

In at least some embodiments, these modes 58 and 60 differ in the amount of radio resources and/or processing required, as well as the routes discoverable using those modes 58, 60. For example, the delegated discovery mode 58 may minimize radio resources and/or processing in the network 10, but limit the routes discoverable. By contrast, the non-delegated discovery mode 60 may expand the routes discoverable, but at the expense of increases radio resources and/or processing in the network 10. In some embodiments, the route origination node dynamically selects which of these modes 58 to 60 to use, e.g., based on weighing the need for conserving radio resources and/or processing against the need for discovering more routes.

FIG. 9 in this regard illustrates a method 500 performed by a node in the network 10 for discovering a route to a route destination node. The method 500 comprises dynamically selecting, based on evaluating one or more selection criteria, which of multiple candidate route discovery modes to use for discovering the route (Block 510). These modes include a delegated discovery mode 58 in which the node delegates discovery of the route to a friend relay node 62 and a non-delegated discovery mode 60 in which the node discovers the route itself. The method 500 further comprises performing discovery of the route according to the selected route discovery mode (Block 520).

In some embodiments, the one or more selection criteria include a quality of a channel from the node to the friend relay node 62. This quality may be indicated for instance by a received signal strength indicator (RSSI) for a signal transmitted from the node to the friend relay node 62. Indeed, it is important that the friend relay node 62 can receive messages well, e.g., as indicated by the RSSI being strong enough to establish a reliable radio connection. Note that, during the friendship establishment procedure, the route origination node may acquire the RSSI from the friend relay node 62 to the route origination node itself. However, such a RSSI might be different from the RSSI from the route origination node to the friend relay node. In an asymmetrical radio network, for example, the two RSSI values could be very different. In this case, the friend relay node 62 may inform the route origination node of its RSSI, so that the route origination node can decide if such a RSSI is good enough from a link point of view.

Alternatively or additionally, the one or more selection criteria may include whether a routing table at the friend relay node 62 has an entry indicating a known route from the friend relay node 62 to the route destination node. This "route status" for a specific route destination node informs the node whether there is an already created route with the same route destination node maintained by the friend relay node 62 that can be reused. If there is no such existing route, the node may opt for the non-delegated discovery mode, e.g., according to FIGS. 4A-4B.

Alternatively or additionally, the one or more selection criteria may include a traffic load of the friend relay node 62. The traffic load may be identified for instance using a normalized equivalent message rate, e.g., 30% or 300 bits/sec. Regardless, such information may be utilized as a reference when making routing discovery mode decisions. If the traffic load at the friend relay node 62 is high, the node may opt for the non-delegated discovery mode, e.g., according to FIGS. 4A-4B. Indeed, if there are too many nodes using the route passing by the friend relay node 62 to the same route destination, the route could eventually overflow due to the limited bandwidth. This could result in lost messages.

Figure 10A:
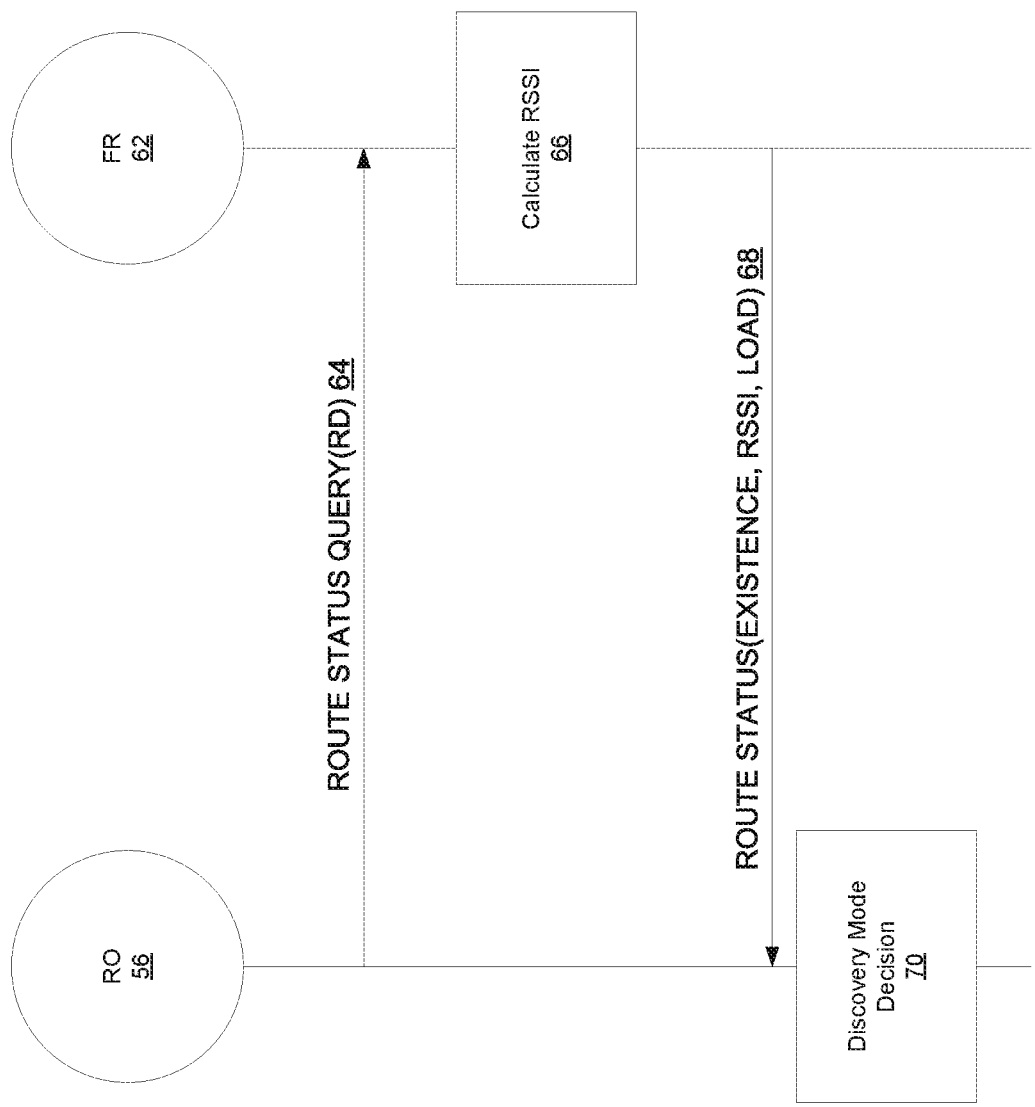
FIG. 10A is a call flow diagram for acquiring one or more selection criteria according to some embodiments in order to perform discovery mode selection.

FIG. 10A illustrates one procedure for acquiring the one or more selection criteria according to some embodiments in order to perform discovery mode selection. As shown, the route origination node 56 transmits a route status query 64 to query the route status of the friend relay node 62 for a particular route destination node. In the message, the desired destination address is included. Responsive to receiving the query, the friend relay node 62 calculates the RSSI of the query. The friend relay node 62 then generates a route status message 68 for returning to the route origination node 56. As shown, the friend relay node 62 generates the route status message 68 to also includes the RSSI and the friend relay node's traffic load. Upon receipt, the route origination node 56 makes its discovery mode decision 70 using one or more of these selection criteria.

Figure 10B:
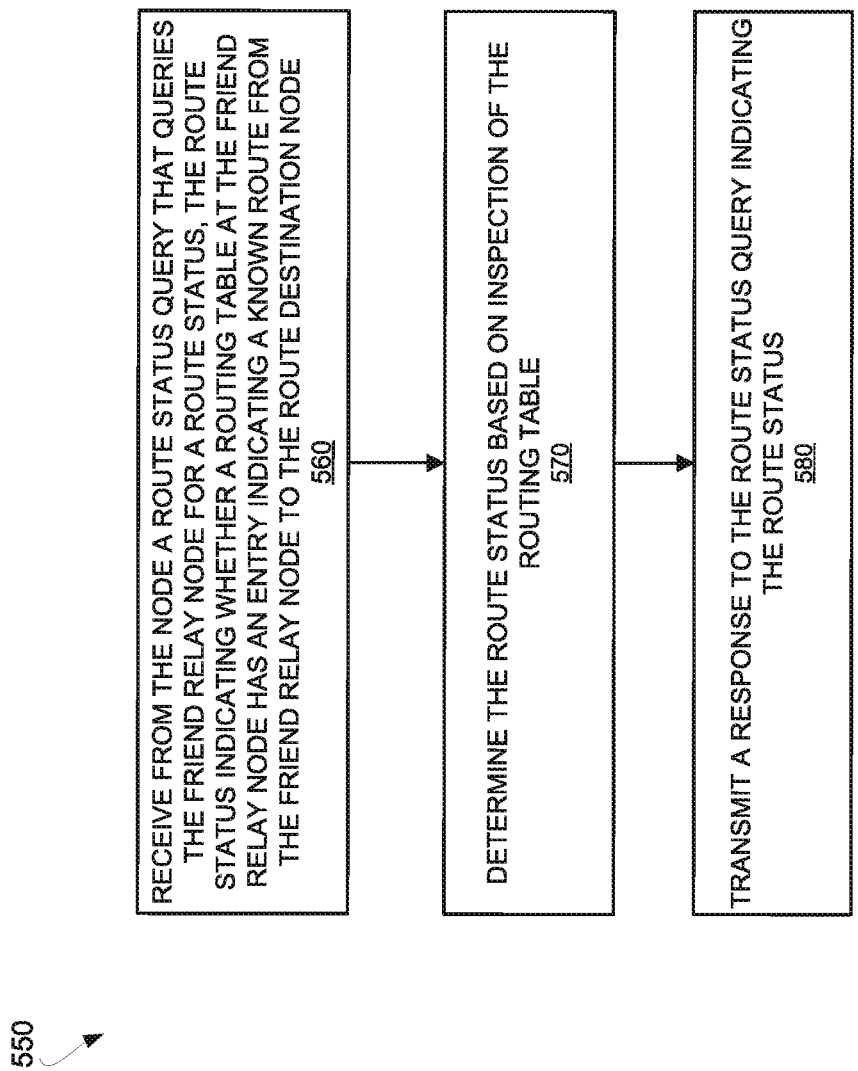
FIG. 10B is a logic flow diagram of a method performed by a friend relay node according to some embodiments.

FIG. 10B illustrates a corresponding method 550 performed by a friend relay node 62 for assisting a node 56 in a mesh communication network 10 discover a route to a route destination node according to some embodiments. As shown, the method 550 comprises receiving from the node 56 a route status query that queries the friend relay node 62 for a route status (Block 560). The route status indicates whether a routing table at the friend relay node 62 has an entry indicating a known route from the friend relay node 62 to the route destination node. The method 550 further comprises determining the route status based on inspection of the routing table (Block 570) and transmitting a response to the route status query indicating the route status (Block 580).

Note that the candidate discovery modes may include one or more additional modes as well. For example, in some embodiments the modes also include a disabled mode. In the disabled mode, the route origination node does not require a friendship to be established with another node or require a routing model to be implemented. Instead, the route origination node simply floods its data messages, e.g., by setting FRND=0 so that all recipients process the message, not just the friend relay node.

In general, therefore, some embodiments herein facilitate a node selecting which route discovery method to use. By reusing an existing route known to a friend relay node in one mode, the performance of the route creation (e.g., for low power nodes) may be optimized. On the other hand, by allowing the route origination node to create the route itself using a next hop node other than a friend, the route may be optimized. In this way, relay node complexity and network bandwidth utilization can be balanced.

Note, too, that route discovery as used herein may be used to find a valid route to a destination. But route discovery may alternatively or additionally be used to "register" the address of a route origination node in the routing table of intermediate nodes, so that messages (e.g., data packets) by that route origination node are correctly delivered.

In view of this, a relay node herein is any type of node (e.g., a wireless device) capable of relaying radio communications from one node to another in a mesh communication network. A relay node may therefore refer to a user equipment (UE), a machine-to-machine (M2M) device, a machine-type communications (MTC) device, a NB-IoT device, etc. However it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an internet of things (IoT) scenario, a relay node as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that a relay node 12 as described above may perform the method 100 in FIG. 3 and any other processing herein by implementing any functional means or units. In one embodiment, for example, the relay node comprises respective circuits or circuitry configured to perform the steps shown in FIG. 3. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 11:
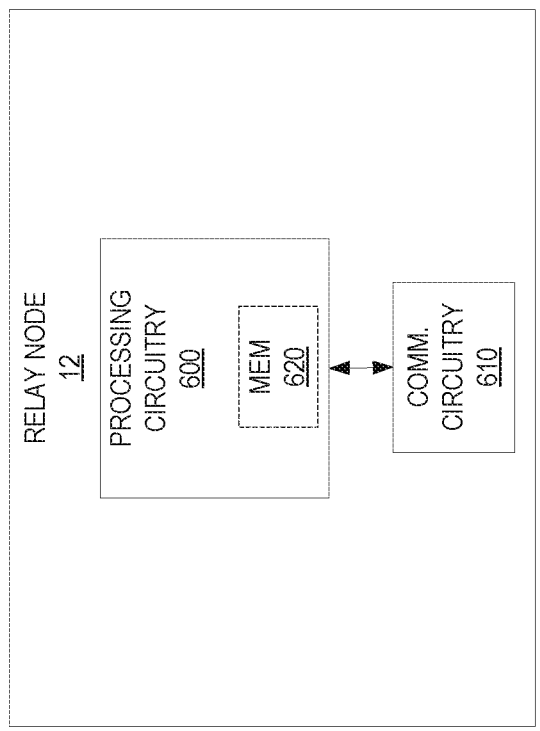
FIG. 11 is a block diagram of a relay node according to some embodiments.

FIG. 11 illustrates a relay node 12 implemented in accordance with one or more embodiments. As shown, the relay node 12 includes processing circuitry 600 and communication circuitry 610. The communication circuitry 610 is configured to transmit and/or receive information to and/or from one or more other nodes, e.g., via any communication technology. Such communication may occur via one or more antennas that are either internal or external to the relay node 12. The processing circuitry 600 is configured to perform processing described above, e.g., in FIG. 4, such as by executing instructions stored in memory 620. The processing circuitry 600 in this regard may implement certain functional means, units, or modules.

Figure 12:
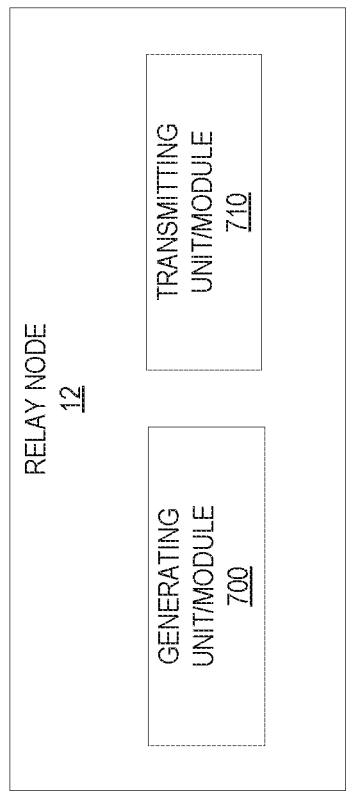
FIG. 12 is a block diagram of a relay node according to other embodiments.

FIG. 12 illustrates a relay node 12 implemented in accordance with one or more other embodiments. As shown, the relay node 12 implements various functional means, units, or modules, e.g., via the processing circuitry 600 in FIG. 11 and/or via software code. These functional means, units, or modules, e.g., for implementing the method in FIG. 3, include for instance a generating unit or module 700 for generating a route request message that requests a route from the route origination node through the mesh communication network to the route destination node. Also included is a transmitting unit or module 710 for transmitting the route request message via unicast or broadcast, depending respectively on whether a routing table at the relay node has or does not have an entry indicating a known route to the route destination node.

Note also that a route origination node 40 as described above may perform the method 200 in FIG. 5 and any other processing herein by implementing any functional means or units. In one embodiment, for example, the route origination node 40 comprises respective circuits or circuitry configured to perform the steps shown in FIG. 5. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 13:
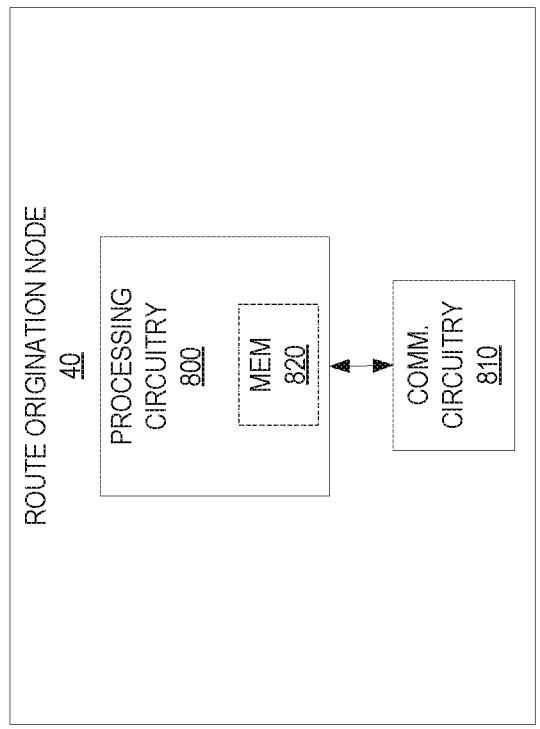
FIG. 13 is a block diagram of a route origination node according to some embodiments.

FIG. 13 illustrates a route origination node 40 implemented in accordance with one or more embodiments. As shown, the route origination node 40 includes processing circuitry 800 and communication circuitry 810. The communication circuitry 810 is configured to transmit and/or receive information to and/or from one or more other nodes, e.g., via any communication technology. Such communication may occur via one or more antennas that are either internal or external to the route origination node 40. The processing circuitry 800 is configured to perform processing described above, e.g., in FIG. 5, such as by executing instructions stored in memory 820. The processing circuitry 800 in this regard may implement certain functional means, units, or modules.

Figure 14:
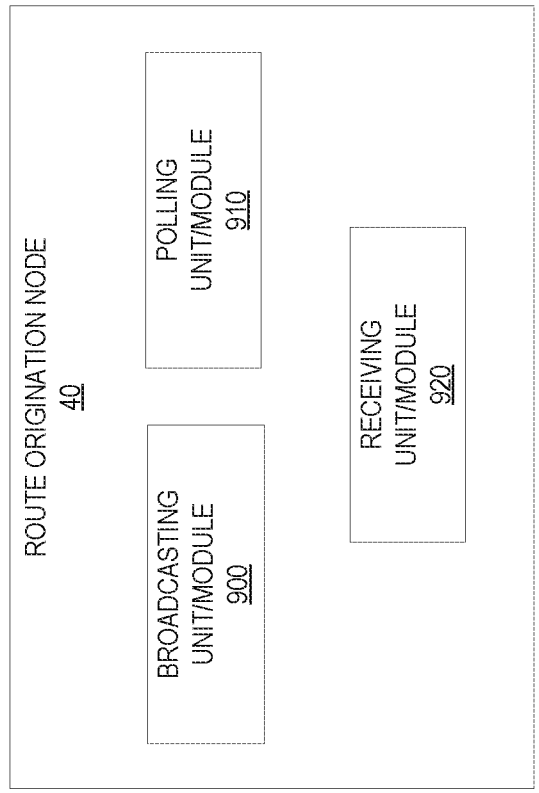
FIG. 14 is a block diagram of a route origination node according to other embodiments.

FIG. 14 illustrates a route origination node 40 implemented in accordance with one or more other embodiments. As shown, the route origination node 40 implements various functional means, units, or modules, e.g., via the processing circuitry 800 in FIG. 13 and/or via software code. These functional means, units, or modules, e.g., for implementing the method in FIG. 5, include for instance a broadcasting unit or module 900 for broadcasting a route request message that requests a route from the route origination node through the mesh communication network to the route destination node. Also included is a polling unit or module 910 for, after broadcasting the route request message, polling a friend relay node for any messages that the friend relay node has received and buffered for the route origination node while the route origination node was in a low power mode. Further included is a receiving unit or module 920 for, responsive to said polling, receiving from the friend relay node or a non-friend relay node a route response message that indicates a route selected by the route destination node, wherein the route selected excludes the friend relay node.

Note further that a non-friend relay node 48 as described above may perform the method 300 in FIG. 6 and any other processing herein by implementing any functional means or units. In one embodiment, for example, the non-friend relay node 48 comprises respective circuits or circuitry configured to perform the steps shown in FIG. 6. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 15:
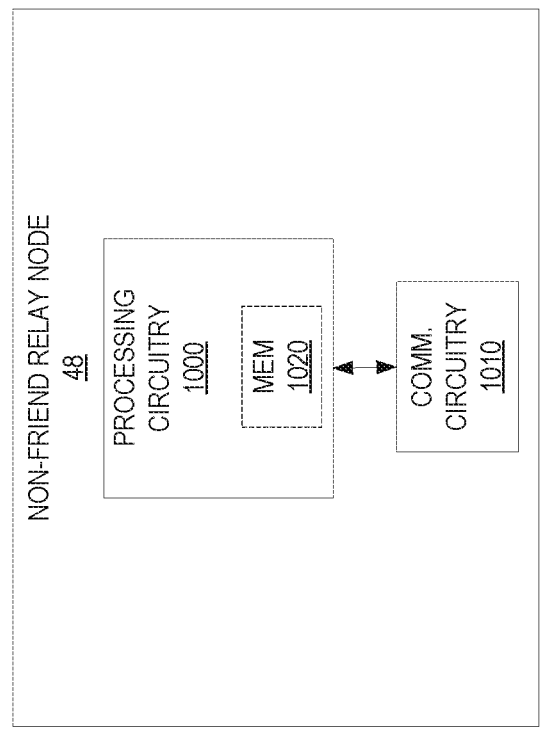
FIG. 15 is a block diagram of a non-friend relay node according to some embodiments.

FIG. 15 illustrates a non-friend relay node 48 implemented in accordance with one or more embodiments. As shown, the non-friend relay node 48 includes processing circuitry 1000 and communication circuitry 1010. The communication circuitry 1010 is configured to transmit and/or receive information to and/or from one or more other nodes, e.g., via any communication technology. Such communication may occur via one or more antennas that are either internal or external to the non-friend relay node 48. The processing circuitry 1000 is configured to perform processing described above, e.g., in FIG. 6, such as by executing instructions stored in memory 1020. The processing circuitry 1000 in this regard may implement certain functional means, units, or modules.

Figure 16:
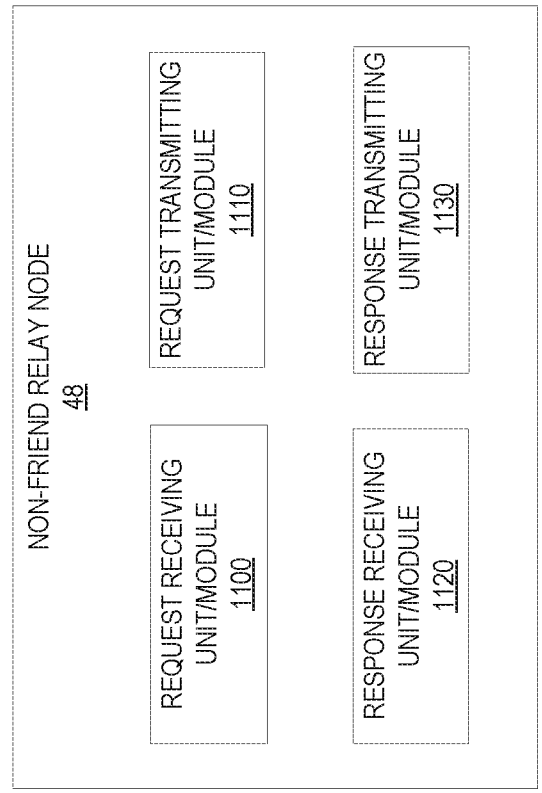
FIG. 16 is a block diagram of a non-friend relay node according to other embodiments.

FIG. 16 illustrates a non-friend relay node 48 implemented in accordance with one or more other embodiments. As shown, the non-friend relay node 48 implements various functional means, units, or modules, e.g., via the processing circuitry 1000 in FIG. 15 and/or via software code. These functional means, units, or modules, e.g., for implementing the method in FIG. 6, include for instance a request receiving unit or module 1100 for receiving from the route origination node a route request message that requests a route from the route origination node through the mesh communication network to the route destination node. Also included is a request transmitting unit or module 1110 for, responsive to receiving the route request message, broadcasting the route request message. Further included is a response receiving unit or module 1120 for, responsive to broadcasting the route request message, receiving a route response message that indicates a route selected by the route destination node. Also included is a response transmitting unit or module 1130 for transmitting the route response message towards the route origination node, by transmitting the route response message towards a friend relay node configured to forward buffered messages to the route origination node during a friend forwarding period or by transmitting the route response message directly to the route origination node during a detected friend forwarding period, wherein the selected route excludes the friend relay node.

Note moreover that a friend relay node 42 as described above may perform the method 400 in FIG. 7 and any other processing herein by implementing any functional means or units. In one embodiment, for example, the friend relay node 42 comprises respective circuits or circuitry configured to perform the steps shown in FIG. 7. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figures 17, 18:
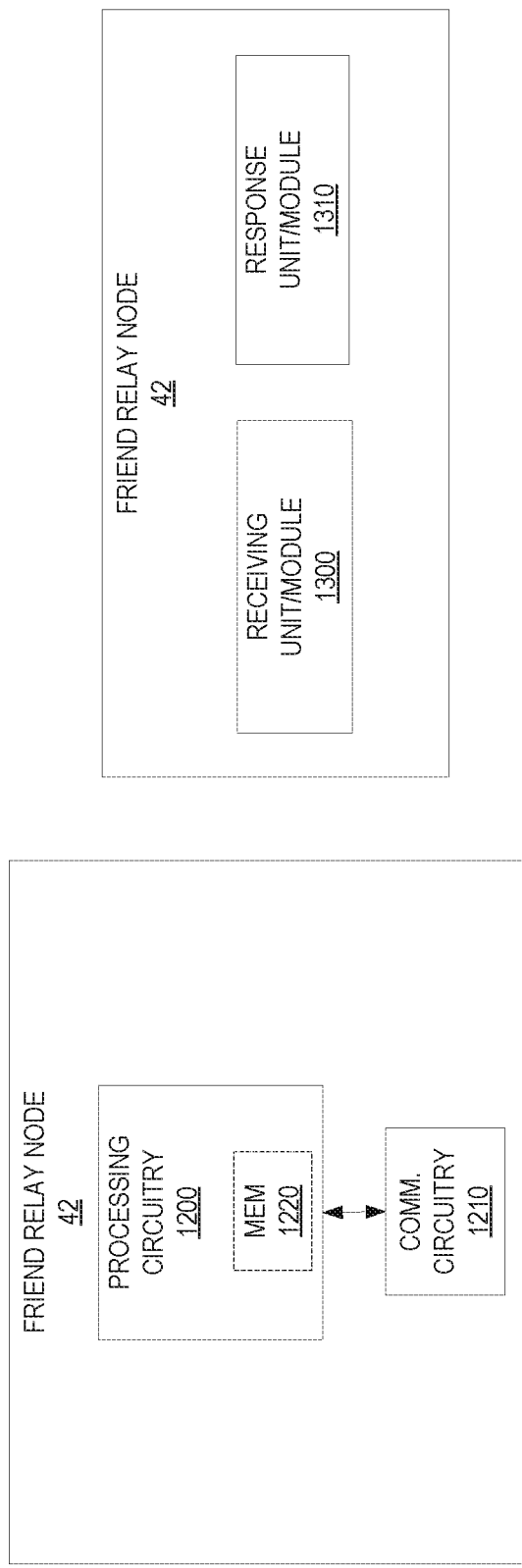
FIG. 17 is a block diagram of a friend relay node according to some embodiments.
FIG. 18 is a block diagram of a friend relay node according to other embodiments.

FIG. 17 illustrates a friend relay node 42 implemented in accordance with one or more embodiments. As shown, the friend relay node 42 includes processing circuitry 1200 and communication circuitry 1210. The communication circuitry 1210 is configured to transmit and/or receive information to and/or from one or more other nodes, e.g., via any communication technology. Such communication may occur via one or more antennas that are either internal or external to the friend relay node 42. The processing circuitry 1200 is configured to perform processing described above, e.g., in FIG. 7, such as by executing instructions stored in memory 1220. The processing circuitry 1200 in this regard may implement certain functional means, units, or modules.

FIG. 18 illustrates a friend relay node 42 implemented in accordance with one or more other embodiments. As shown, the friend relay node 42 implements various functional means, units, or modules, e.g., via the processing circuitry 1200 in FIG. 17 and/or via software code. These functional means, units, or modules, e.g., for implementing the method in FIG. 7, include for instance a receiving unit or module 1300 for receiving a route request message which requests a route to a route destination node that has delegated route discovery to the friend relay node. Also included is a response unit or module 1310 for, responsive to the route request message, selecting a route to the route destination node and transmitting a route response message indicating the selected route on behalf of the route destination node.

Note also that a node 56 (e.g., RO) as described above may perform the method 500 in FIG. 9 and any other processing herein by implementing any functional means or units. In one embodiment, for example, the node 56 comprises respective circuits or circuitry configured to perform the steps shown in FIG. 9. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 19:
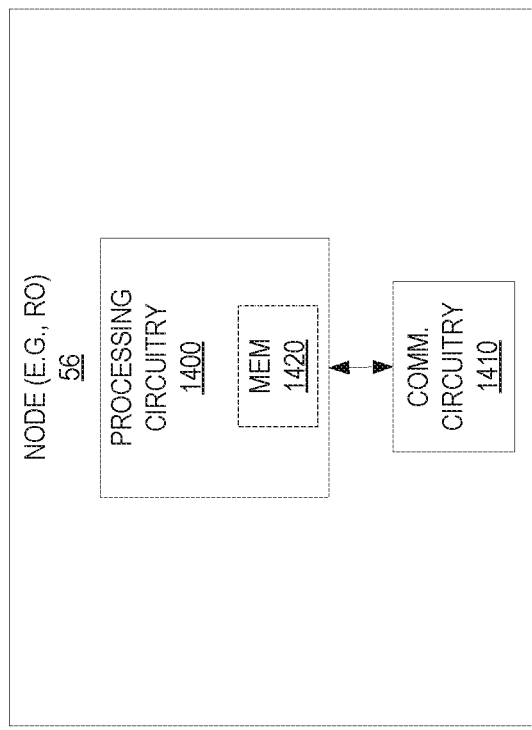
FIG. 19 is a block diagram of a node according to some embodiments.

FIG. 19 illustrates a node 56 implemented in accordance with one or more embodiments. As shown, the node 56 includes processing circuitry 1400 and communication circuitry 1410. The communication circuitry 1410 is configured to transmit and/or receive information to and/or from one or more other nodes, e.g., via any communication technology. Such communication may occur via one or more antennas that are either internal or external to the node 56. The processing circuitry 1400 is configured to perform processing described above, e.g., in FIG. 9, such as by executing instructions stored in memory 1420. The processing circuitry 1400 in this regard may implement certain functional means, units, or modules.

Figure 20:
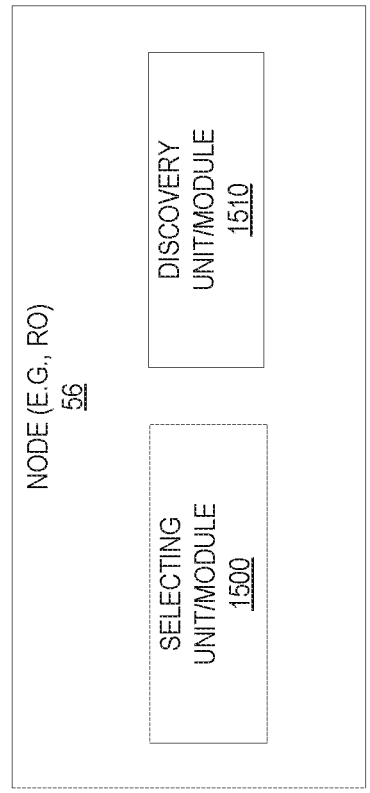
FIG. 20 is a block diagram of a node according to other embodiments.

FIG. 20 illustrates a node 56 implemented in accordance with one or more other embodiments. As shown, the node 56 implements various functional means, units, or modules, e.g., via the processing circuitry 1400 in FIG. 19 and/or via software code. These functional means, units, or modules, e.g., for implementing the method in FIG. 9, include for instance a selecting unit or module 1500 for dynamically selecting, based on evaluating one or more selection criteria, which of multiple candidate route discovery modes to use for discovering the route, wherein the candidate route discovery modes include a delegated discovery mode in which the node delegates discovery of the route to a friend relay node and a non-delegated discovery mode in which the node discovers the route itself. Also included is a discovery unit or module 1510 for performing discovery of the route according to the selected route discovery mode.

Note further that a friend relay node 62 as described above may perform the method 550 in FIG. 10B and any other processing herein by implementing any functional means or units. In one embodiment, for example, the friend relay node 62 comprises respective circuits or circuitry configured to perform the steps shown in FIG. 10B. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 21:
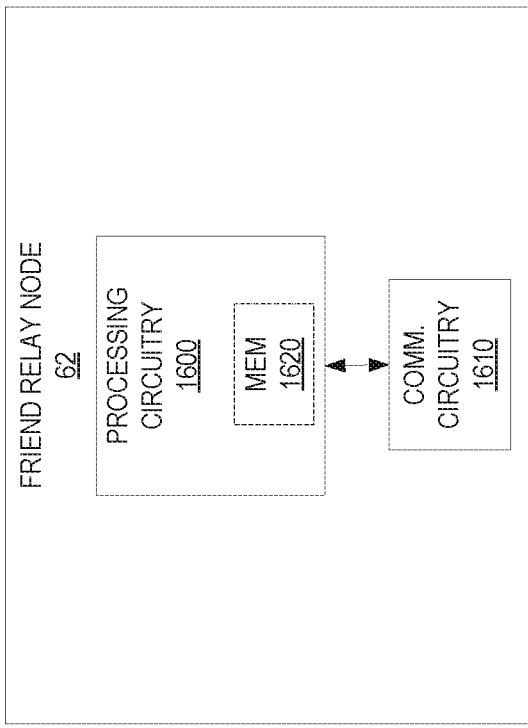
FIG. 21 is a block diagram of a friend relay node according to some embodiments.

FIG. 21 illustrates a friend relay node 62 implemented in accordance with one or more embodiments. As shown, the friend relay node 62 includes processing circuitry 1600 and communication circuitry 1610. The communication circuitry 1610 is configured to transmit and/or receive information to and/or from one or more other nodes, e.g., via any communication technology. Such communication may occur via one or more antennas that are either internal or external to the friend relay node 62. The processing circuitry 1600 is configured to perform processing described above, e.g., in FIG. 10B, such as by executing instructions stored in memory 1620. The processing circuitry 1600 in this regard may implement certain functional means, units, or modules.

Figure 22:
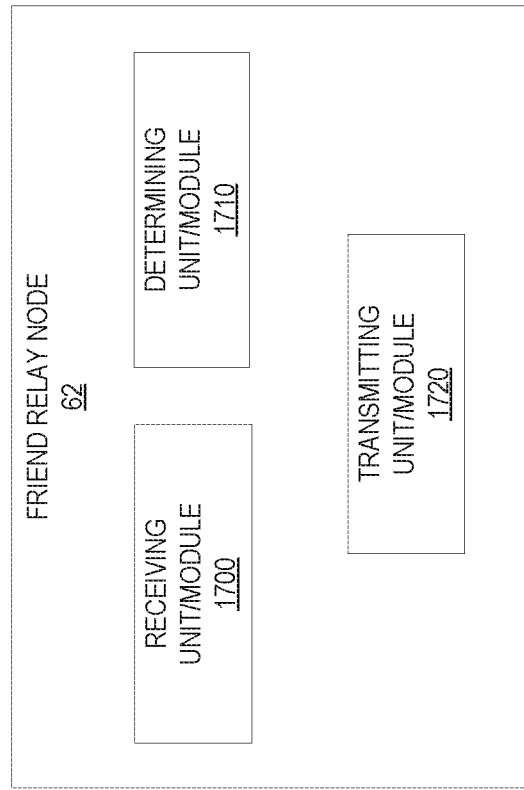
FIG. 22 is a block diagram of a friend relay node according to other embodiments.

FIG. 22 illustrates a friend relay node 62 implemented in accordance with one or more other embodiments. As shown, the friend relay node 62 implements various functional means, units, or modules, e.g., via the processing circuitry 1600 in FIG. 21 and/or via software code. These functional means, units, or modules, e.g., for implementing the method in FIG. 10B, include for instance a receiving unit or module 1700 for receiving from the node a route status query that queries the friend relay node for a route status, the route status indicating whether a routing table at the friend relay node has an entry indicating a known route from the friend relay node to the route destination node. Also included is a determining unit or module 1710 for determining the route status based on inspection of the routing table. Further included is a transmitting unit or module 1720 for transmitting a response to the route status query indicating the route status.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method performed by a relay node for discovering a route between a route origination node and a route destination node in a mesh communication network, the method comprising:
generating a route request message that requests a route from the route origination node through the mesh communication network to the route destination node; and
transmitting the route request message via unicast or broadcast, depending respectively on whether a routing table at the relay node has or does not have an entry indicating a known route from the relay node to the route destination node,
wherein the relay node is a friend relay node delegated by both the route origination node and another origination node in the mesh communication network to discover a route towards the same route destination node, wherein the known route is part of a route previously discovered by the relay node from the another route origination node to the route destination node.

2. The method of claim 1, comprising transmitting the route request message via unicast to a next-hop node along the known route from the relay node to the route destination node based on determining that the routing table has an entry indicating the known route.

3. The method of claim 1, further comprising receiving, in response to the route request message, a route response message that indicates a route selected by the route destination node.

4. The method of claim 1, further comprising receiving the route request message via unicast from another node in the mesh communication network, and wherein said generating comprises, responsive to receiving the route request message, modifying the route request message to include the relay node in a route tracked by the route request message.

5. A method performed by a node in a mesh communication network for discovering a route to a route destination node, the method comprising:
dynamically selecting, based on evaluating one or more selection criteria, which of multiple candidate route discovery modes to use for discovering the route, wherein the candidate route discovery modes include a delegated discovery mode in which the node delegates discovery of the route to a friend relay node and a non-delegated discovery mode in which the node discovers the route itself; and
performing discovery of the route according to the selected route discovery mode.

6. The method of claim 5, wherein performing discovery of the route according to the non-delegated discovery mode comprises broadcasting a route request message that requests the route to the route destination node, polling the friend relay node for any messages that the friend relay node has received and buffered for the node while the node was in a low power mode, and, responsive to said polling, receiving from the friend relay node or a non-friend relay node a route response message that indicates a route selected by the route destination node, wherein the route selected excludes the friend relay node.

7. The method of claim 6, wherein the one or more selection criteria include whether a routing table at the friend relay node has an entry indicating a known route from the friend relay node to the route destination node.

8. The method of claim 6, wherein the one or more selection criteria include a traffic load of the friend relay node.

9. The method of claim 6, further comprising:
transmitting a route status query that queries the friend relay node for a route status, the route status indicating whether a routing table at the friend relay node has an entry indicating a known route from the friend relay node to the route destination node; and
receiving a response to the route status query that indicates the route status, a received quality of the route status query, and a traffic load of the friend relay node.

10. The method of claim 5, wherein the one or more selection criteria include a quality of a channel from the node to the friend relay node.

11. The method of claim 10, wherein the quality of the channel is indicated by a received signal strength indicator for a signal transmitted from the node to the friend relay node.

12. A relay node for discovering a route between a route origination node and a route destination node in a mesh communication network, the relay node comprising:
processing circuitry and a memory, the memory containing instructions executable by the processing circuitry whereby the relay node is configured to:
generate a route request message that requests a route from the route origination node through the mesh communication network to the route destination node; and transmit the route request message via unicast or broadcast, depending respectively on whether a routing table at the relay node has or does not have an entry indicating a known route from the relay node to the route destination node, wherein the relay node is a friend relay node delegated by both the route origination node and another origination node in the mesh communication network to discover a route towards the same route destination node, wherein the known route is part of a route previously discovered by the relay node from the another route origination node to the route destination node.

13. The relay node of claim 12, wherein the memory contains instructions executable by the processing circuitry whereby the relay node is configured to transmit the route request message via unicast to a next-hop node along the known route from the relay node to the route destination node based on determining that the routing table has an entry indicating the known route.

14. The relay node of claim 12, wherein the relay node is further configured to transmit the route request message via unicast to a next-hop node along the known route from the relay node to the route destination node based on determining that the routing table has an entry indicating the known route from the relay node to the route destination node.

15. The relay node of claim 12, the relay node is further configured to receive, in response to the route request message, a route response message that indicates a route selected by the route destination node.

16. The relay node of claim 12, the relay node is further configured to receive the route request message via unicast from another node in the mesh communication network, and wherein the generation of the a route request message comprises, responsive to receiving the route request message, modifying the route request message to include the relay node in a route tracked by the route request message.

17. A node configured for use in a mesh communication network for discovering a route to a route destination node, the node comprising:

processing circuitry and a memory, the memory containing instructions executable by the processing circuitry whereby the node is configured to:

dynamically select, based on evaluating one or more selection criteria, which of multiple candidate route discovery modes to use for discovering the route, wherein the candidate route discovery modes include a delegated discovery mode in which the node delegates discovery of the route to a friend relay node and a non-delegated discovery mode in which the node discovers the route itself; and perform discovery of the route according to the selected route discovery mode.

18. The node of claim 17, wherein performing discovery of the route according to the non-delegated discovery mode comprises broadcasting a route request message that requests the route to the route destination node, polling the friend relay node for any messages that the friend relay node has received and buffered for the node while the node was in a low power mode, and, responsive to said polling, receiving from the friend relay node or a non-friend relay node a route response message that indicates a route selected by the route destination node, wherein the route selected excludes the friend relay node.

19. The node of claim 18, wherein the one or more selection criteria include whether a routing table at the friend relay node has an entry indicating a known route from the friend relay node to the route destination node.

20. The node of claim 18, wherein the one or more selection criteria include a traffic load of the friend relay node.

21. The node of claim 18, further comprising:

transmitting a route status query that queries the friend relay node for a route status, the route status indicating whether a routing table at the friend relay node has an entry indicating a known route from the friend relay node to the route destination node; and receiving a response to the route status query that indicates the route status, a received quality of the route status query, and a traffic load of the friend relay node.

22. The node of claim 17, wherein the one or more selection criteria include a quality of a channel from the node to the friend relay node.

23. The node of claim 22, wherein the quality of the channel is indicated by a received signal strength indicator for a signal transmitted from the node to the friend relay node.

* * * * *